Dec. 27, 1927.

J. E. LOVELY 1,654,512

CHUCK

Filed July 15, 1924      6 Sheets-Sheet 1

Dec. 27, 1927.

J. E. LOVELY

CHUCK

Filed July 15, 1924   6 Sheets-Sheet 3

1,654,512

Dec. 27, 1927.  1,654,512
J. E. LOVELY
CHUCK
Filed July 15, 1924   6 Sheets-Sheet 6

Patented Dec. 27, 1927.

1,654,512

UNITED STATES PATENT OFFICE.

JOHN E. LOVELY, OF SPRINGFIELD, VERMONT, ASSIGNOR TO JONES & LAMSON MACHINE COMPANY, OF SPRINGFIELD, VERMONT, A CORPORATION OF VERMONT.

CHUCK.

Application filed July 15, 1924. Serial No. 726,124.

This invention relates to chucks for holding work in lathes, or other machines having rotary work spindles, and provides a construction whereby the work is automatically clamped in position to be driven when the machine is started and is automatically released on the completion of the machining operation as the machine is to be stopped so that it may be removed. Where work is to be held between centers, provision is made by which it may be clamped in its centered position regardless of surface inaccuracies, or if it is not desired to use centers the work may be centered by its periphery. Certain features of the invention may also be used when the work is intended to remain stationary in desired relation to moving tools. The work is engaged by clamping elements or jaws with a gripping force proportional to the resistance to the turning of the work afforded by the action of the tools thereon so that slipping of the work is prevented, and the jaws are released from the work at the proper time by power so that complete release is assured.

Further features of this invention will appear from a more complete description thereof in connection with the accompanying drawings in which.

Figure 1:
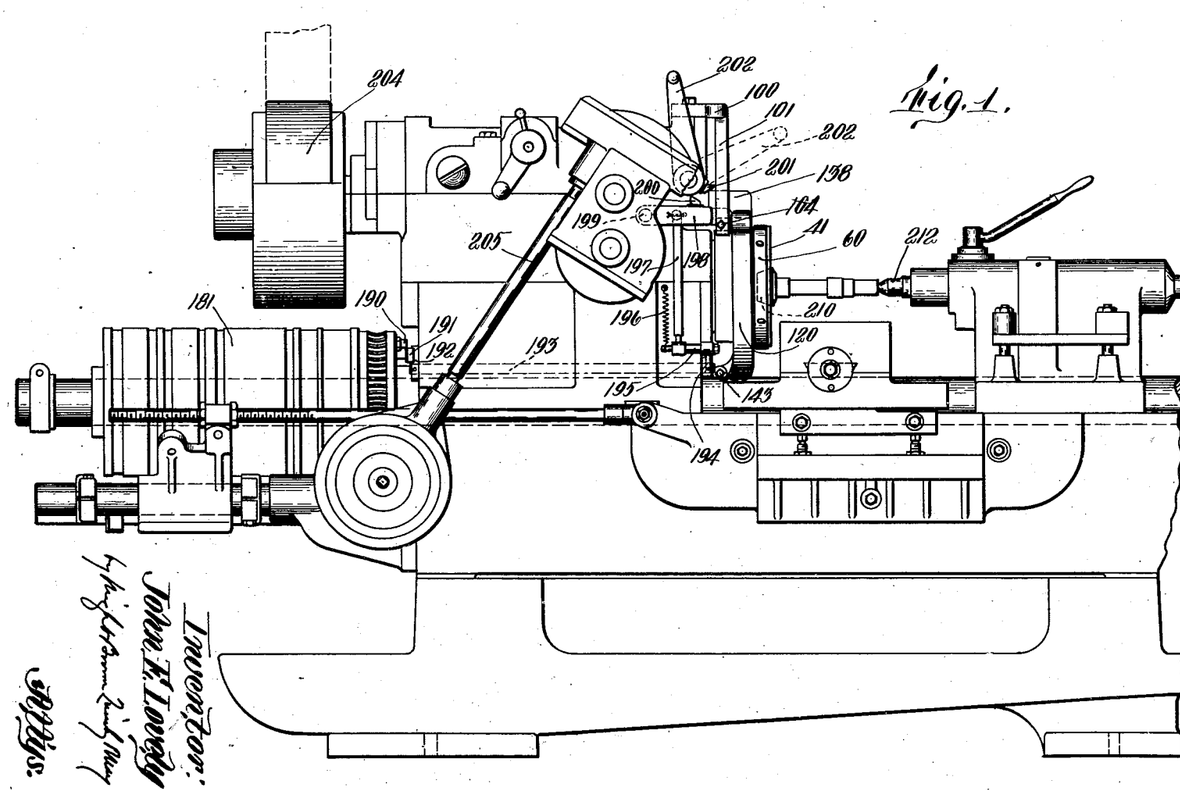
Figure 1 is a fragmentary front elevation of a Fay lathe showing the chuck applied thereto.
Figures 2, 3, 4, 5, 6:
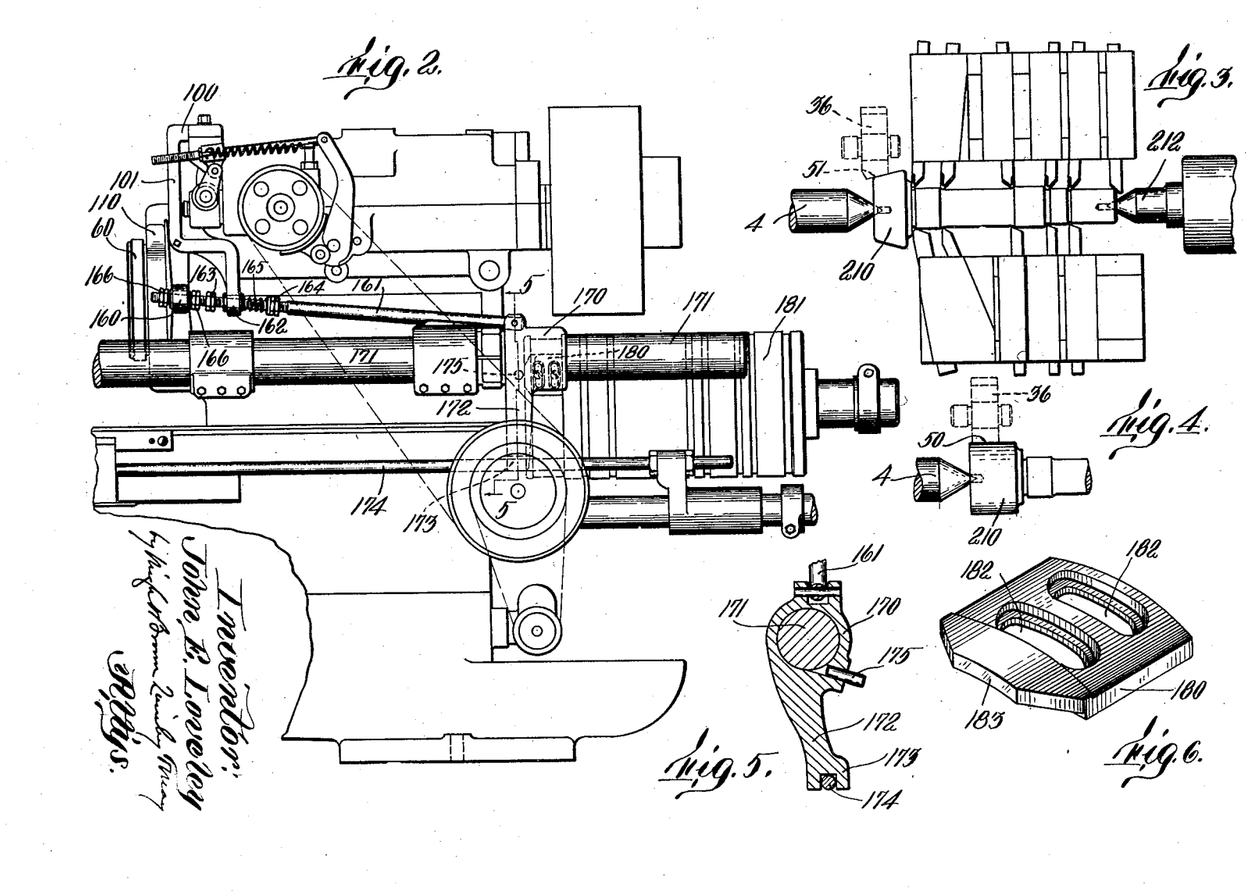
Figure 2 is a fragmentary rear elevation of the same.
Figure 3 is a fragmentary plan illustrating the relation of the work to the tools and chuck-gripping elements or jaws.
Figure 4 illustrates a different form between the work and chuck jaws.
Figure 5 is a detail section on line 5—5 of Figure 2.
Figure 6 is a perspective of the chuck opening cam.
Figures 11, 12, 13, 14, 15, 16, 17, 18:
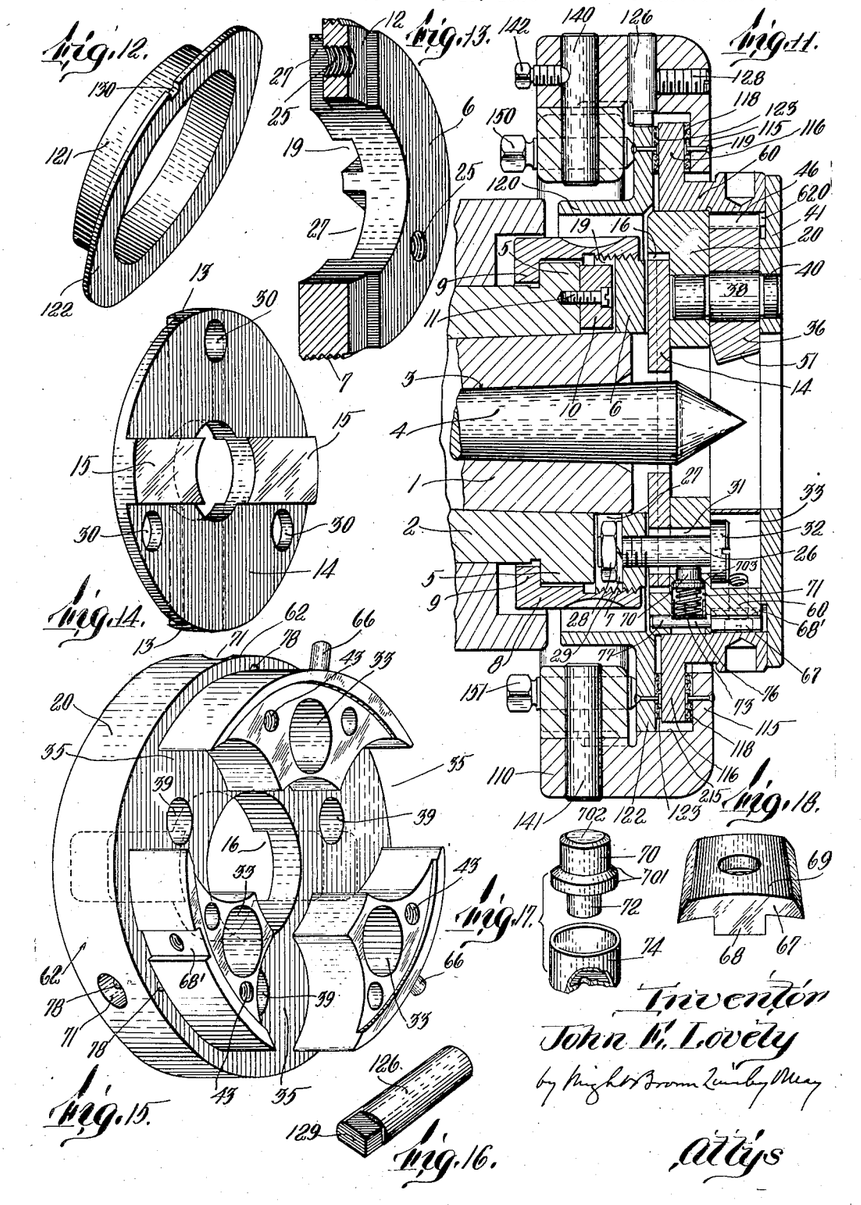
Figure 11 is a fragmentary section on line 11—11 of Figure 7.
Figure 12 is a perspective of a brake element.
Figure 13 is a perspective in section of an adapter plate.
Figure 14 is a perspective of an intermediate coupling element.
Figure 15 is a perspective of the chuck jaw holder.
Figures 16, 17 and 18 are perspectives of detail parts.

This chuck is shown in Figures 1 and 2 as applied to the well known Fay lathe. Referring first to Figure 11, 1 and 2 indicate portions of the rotary work spindle of the lathe headstock, the member 1 having a central tapered perforation 3 for the reception of the usual cone center 4 with which the work may be engaged in the usual manner. The member 2 has an outer end flange 5 for retaining in position an adapter plate shown at 6. This adapter plate, as shown in Figures 11 and 13, comprises a ring fitting over the outer end of the member 1 and externally threaded as at 7 for engagement with an internally threaded retaining collar 8 having an inwardly directed flange 9 at its inner end engageable with the rear face of the flange 5. In order to hold the ring 6 from turning relative to the spindle it has a cut-out portion 19 on its rear face in which engages a block or key 10 made fast to the outer end of the member 2 as by means of a screw 11.

As shown best in Figure 13, this adapter plate is provided with a transverse guideway or channel 12 on its forward face within which may slide a corresponding shaped rib 13 on the rear face of a disk 14, shown detached in Figure 14, this disk being the intermediate member of a floating coupling. On the forward face of this disk 14 is a rib 15 positioned at right angles to the rib 13 and this rib slides freely in a corresponding guideway or channel 16 in the rear face of a chuck jaw holder member 20 shown detached in Figure 15. The inner member or adapter plate 6 is provided with spaced threaded perforations 25 in which engage the inner ends of bolts 26, the rear face of the adapter plate being cut away as at 27 to house nuts 28 and lock washers 29 on the inner ends of these bolts. The plate 14 and the holder 20 are provided with enlarged perforations 30 and 31, respectively, through which the bolts 26 loosely pass, the heads 32 of these bolts resting against the bases of counterbored portions 33 of the holes 31. These parts are so assembled that the holder is permitted a limited sliding movement in any direction across the axis of rotation of the spindle, but the parts are sufficiently tight to prevent noticeable relative endwise motion. This construction furnishes a floating coupling between the holder and the spindle so that work-clamping jaws carried by the holder may engage the periphery of the work even though this periphery is eccentric to the axis about which it is to be rotated which axis is in line with the axis of the cone center 4.

Figures 7, 8, 9, 10:
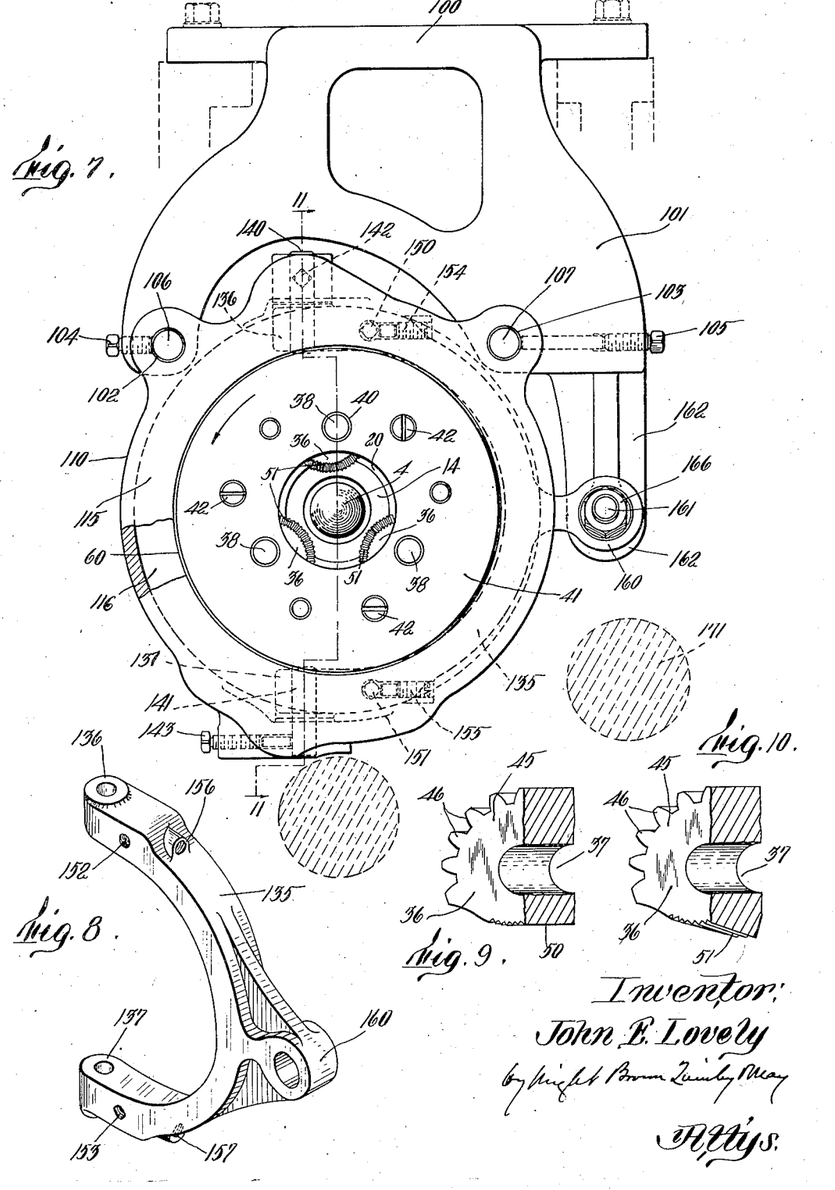
Figure 7 is an elevation of the chuck, certain of the tool bars of the machine being shown in section.
Figure 8 is a perspective of a yoke member.
Figures 9 and 10 are sectional perspectives illustrating different forms of work-gripping jaws.

Between the holes 31 the forward face of the holder 20 is cut away or counterbored to form substantially circular sockets 35 for the reception of oscillatory clamping elements or jaws 36, two forms of which are shown detached in Figures 9 and 10. Each of these jaws has a perforation 37 therethrough for the reception of a pivot shaft 38, the inner end of which bears in a perforation 39 centrally of each socket portion 35 and the outer end of which bears in a perforation 40 in a retaining cover plate 41 which bridges over the outer end of the holder and is made fast thereto by means such as screws 42 passed through holes therein and threaded into threaded holes 43 in the forward face of the holder. Preferably three of these jaws are used substantially equally spaced from each other and pivoted at equal distances from the center or axis of the holder in order that their grip on rough or unsymmetrical work may be automatically effected. More than three would require additional compensating devices. Each of the jaws 36 has a portion of its circumference arranged concentrically with the perforation 37 as shown at 45, this portion being provided with a series of gear teeth 46 thereon. The remainder of the periphery of these jaws is formed on a curve eccentric to the perforation 37, this portion being either parallel with the axis of the perforation 37, as shown in Figure 9 at 50, or inclined relative to this axis, as shown at 51 in Figure 10, and it is preferably serrated axially as shown in order to give a firm clamping engagement with the work.

Figures 23, 24, 25:
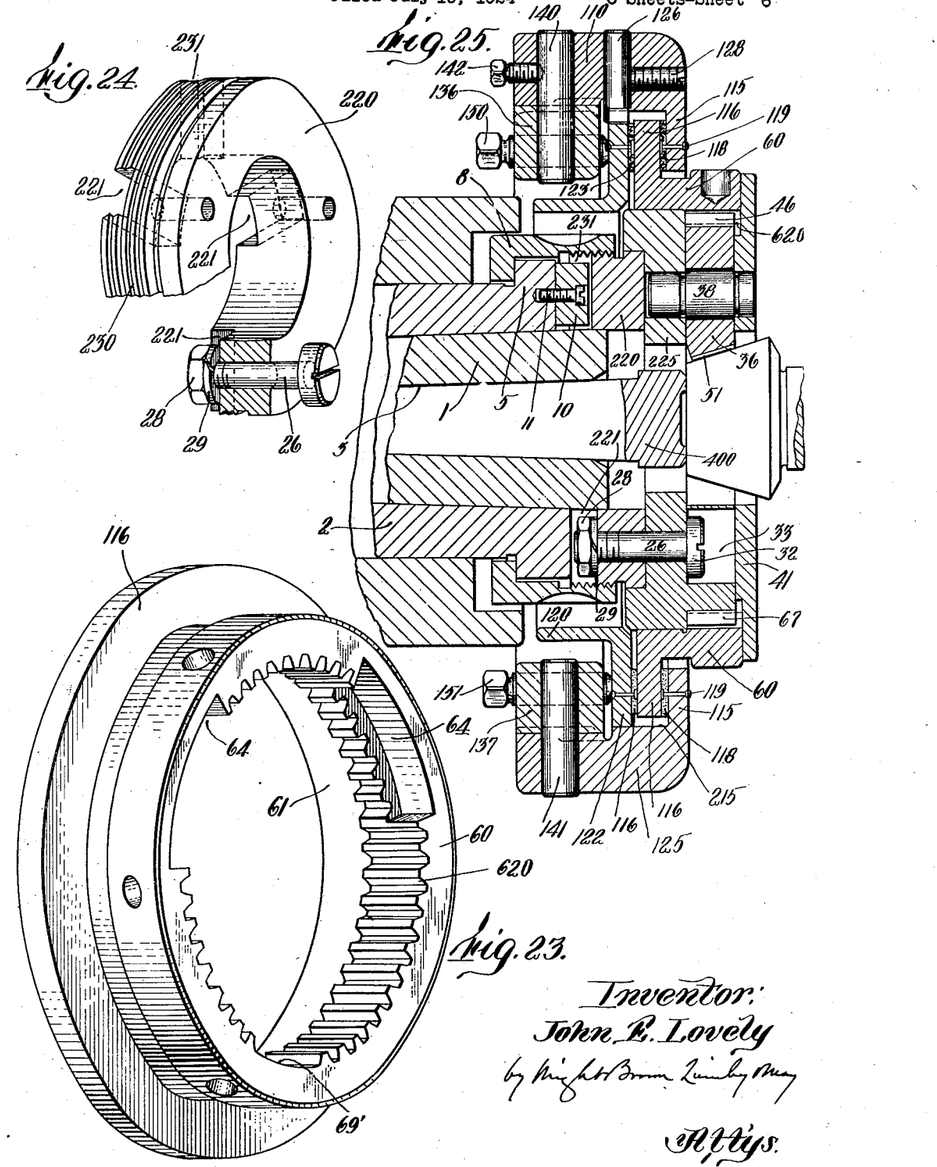
Figure 23 is a perspective of the jaw actuating member.
Figure 24 is a perspective partly in section of a modified construction of adapter plate.
Figure 25 is a section similar to Figure 11, but showing the adapter plate of Figure 24 in place of the adapter plate and floating coupling of Figure 11.

As the work-engaging faces of these jaws are eccentrically disposed it is evident that by rotating these elements about the axes of shafts 38 their work-engaging faces may be caused to approach and recede from each other, depending on the direction in which these elements or jaws are rotated. The eccentricities of the several jaws are formed in the same direction so that by rotating all the jaws simultaneously in one direction, their work-engaging faces may be caused to approach each other and by rotating in the opposite direction to recede from each other. In order that this motion may be made simultaneous an internal gear member 60, shown detached in Figure 23, is employed. This member has an internal bearing periphery 61 formed to rotate on a rearward portion 62 of the holder 20 and it is held in position by the outer edge of the retaining plate 41 which is of sufficient diameter to project thereover as indicated clearly in Figure 1. The teeth 620 of this internal gear are formed to engage with the teeth 46 of the work-clamping jaws so that by rotation of this internal gear or ring member simultaneous and equal motion of the several work-gripping jaws is insured. This internal ring gear is normally urged into a position which will insure the engagement of the work-gripping elements or jaws with the work. For this purpose portions of its toothed interior are cut away to form sockets 64 within each of which may bear a coil spring 65, each of these springs bearing against one end of the socket 64, and at its other end against a pin 66 projecting into the socket portion from the outer periphery of the holder 20, this spring reacting between the pin 66, and the end wall of the socket 64 acts to urge the internal ring gear to rotate relative to the holder in the direction of rotation of the spindle, the eccentricity of the jaws being such that this direction of relative motion causes their work-engaging faces to approach each other. These springs therefore act to normally hold the clamping jaws in engagement with the work and any resistance offered to the turning of the work, as for example, by the tools working thereon, tends to rotate the jaws further in the same direction to impart a firmer grip thereon so that slipping is effectually prevented, the heavier the resistance to the turning, the more effective being the clamping engagement of the jaws on the work.

Means is preferably provided for limiting the extent of relative rotation between the gear ring 60 and the holder 20. This may comprise a stop shoe 67, shown detached in Figure 18, having a rib 68 fitting within a slot 68' in the outer face of the holder 20 and having a head portion 69 movable within a slot 69' in the ring 60. This block may be fixed in position by any suitable means such as a screw shown at 690 in Figure 19. The jaws being seated in the counterbored sockets which are bridged over by the cover plate 41 are effectually shielded so that chips can not find their way between the teeth of the jaws and of the internal gear 60.

Figures 19, 20, 21, 22:
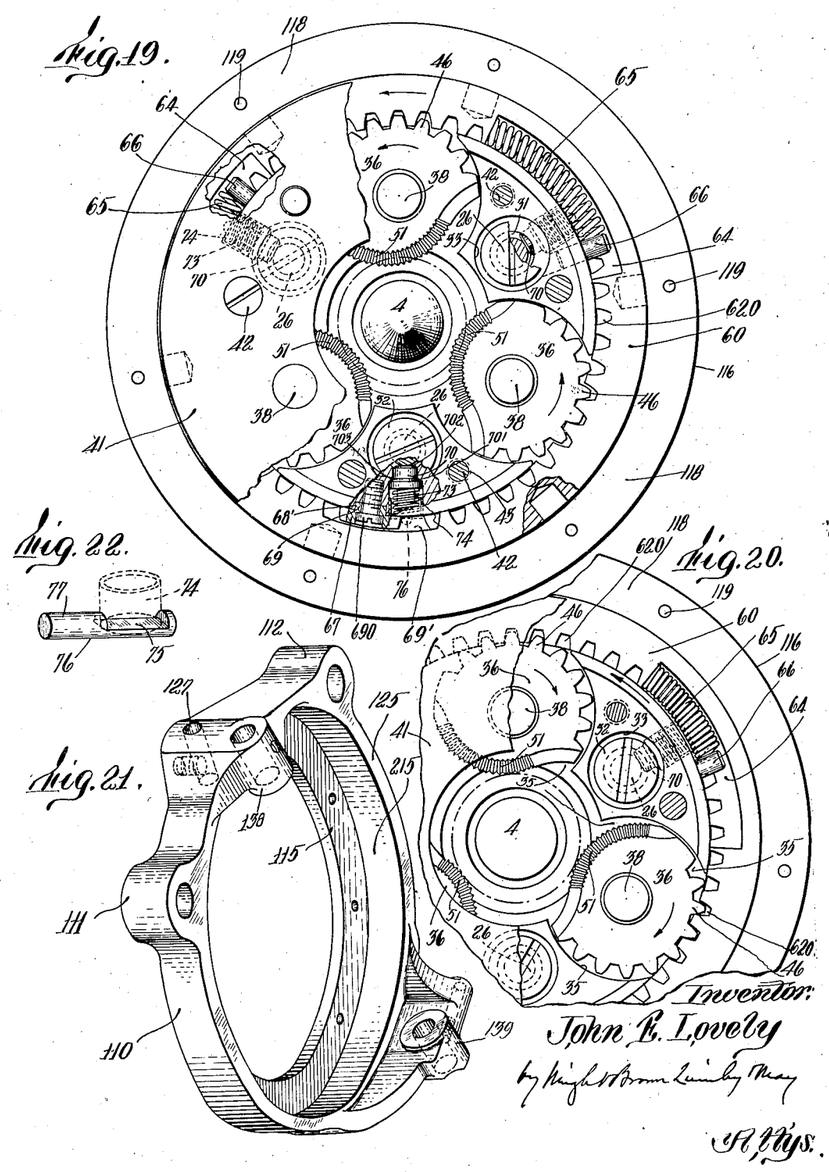
Figure 19 is a face view partly broken away of the chuck as applied to a lathe spindle, the chuck jaws being in work-engaging position.
Figure 20 is a fragmentary view similar to a portion of Figure 19, but showing the jaws released from the work.
Figure 21 is a perspective of a yoke carrier.
Figure 22 is a perspective of two parts forming a spring-receiving abutment.

While when the work is supported between centers it is important that the clamping jaws should maintain driving connection therewith and yet be permitted to engage work having a periphery somewhat eccentric to its axis of rotation, it is desirable that the jaws be urged to a concentric position so that when no work is in position and the spindle is revolved, the parts will be held in axial relation and be prevented from being thrown out of balance. For this reason centering devices for the holder have been indicated, detail parts thereof being shown in Figures 17 and 22 and assembled in Figure 11. As therein shown these devices comprise plungers 70 having their ends engageable with the sides of the bolts 26 and slidable in sockets 71 radially arranged in the holder 20. These plungers have outwardly extending stems 72 about which are engaged coil springs 73 which are supported at their outer ends in cup-shaped sockets 74, each of these sockets being seated, as shown in Figures 11 and 22, in a cut away portion 75 of a pin 76, this pin having a cylindrical end portion 77 seated in a perforation 78 in the rear portion of the holder 20. These spring plungers press radially inwardly against the bolts 26 and thus serve to resiliently urge the holder to take a position concentric with the spindle. A shoulder 701 on plunger 70 seats against shoulder 703 of holes 71 in holder 20 when the holder is in a position concentric with the spindle. By this construction each plunger 70 inactively engages a bolt 26 while the holder is centered, but comes into action when the holder moves in its direction, such motion displacing the plunger from its seat 703 in opposition to the pressure of the spring 73.

In order that the jaws may be moved to released position means is provided by which the rotation of the gear ring with the spindle may be stopped so that the continued angular motion of the spindle thereafter before it has been stopped will act to give a reverse relative rotation between the ring and the holder against the tension of the spring 65, this causing the jaws to be positively retracted from the work by the power used to produce this additional angular motion of the spindle. The parts then assume the position shown in Figure 20 with the jaws in their retracted position, the directions of necessary rotary motion of the various elements involved being shown by the arrows on this figure. In order to accomplish this a brake device action on the gear ring 60 has been devised which is adapted to be thrown into action automatically just before the rotation of the spindle itself is stopped.

Fixed to the top of the headstock of the machine is a bracket casting 100 (see Figures 1, 2 and 7) having a portion 101 depending over the front face of the headstock toward the end of the spindle. This portion 101 is formed with a pair of spaced openings 102 and 103 in which are fixed, as by means of set screws 104 and 105, a pair of forwardly extending pins 106 and 107. On these pins is supported a brake ring element 110 shown detached in Figure 21, this element having perforated lugs 111 and 112 taking over the pins 106 and 107. It is also provided with an inwardly extending angle flange 115 at its forward face which extends forwardly of an outwardly extending angular flange 116 on the ring gear element 60, as shown more particularly in the Figure 11. To the rear face of the flange 115 may be fixed, as by rivets 119, frictional material such as asbestos composition, as shown at 118 in Figure 11. Positioned opposite to the rear face of the flange 116 is a second brake ring element 120, shown detached in Figure 12. This element has a sleeve portion 121 and an outwardly extending angular flange portion 122 at its forward end. To the forward face of this flange portion may be fixed frictional material as at 123 similar to the friction material 118. The outer edge of the flange 122 bears within the cylindrical portion 215 of the brake ring 110 and is prevented from rotation relative thereto while permitted axial movement by means of a key pin 126 extending radially through the brake ring 110 through a perforation 127 therein, this pin being fixed in position by means of a set screw 128. This pin is provided with a squared end 129, as shown best in Figure 16, which rides within a notch 130 in the flange 122.

The brake rings are adapted to be pressed toward each other to engage the flange 116 therebetween and for this purpose a yoke member 135, shown detached in Figure 8, is pivoted at its ends 136 and 137 to lugs 138 and 139 extending rearwardly from the brake ring 110. The pivots for this yoke member comprise pins 140 and 141, as shown in Figures 7 and 11, which may be fixed in perforations in the lugs 138 and 139 by means of set screws 142 and 143. It will be noted from an inspection of Figure 7 that the pivots 140 and 141 are at one side of a diametrical line passing through the axis of the spindle. Spaced a suitable distance from the ends 136 and 137 of the yoke member 135, are positioned abutment screws 150 and 151 threaded in perforations 152 and 153 therein, these screws being fixed in adjusted position by set screws 154 and 155 threaded in suitable openings 156 and 157 therein. The forward ends of these abutment screws 150, 151 are formed to engage on the rear face of the flange 122 so that by rocking the central portion of the yoke member forwardly, the abutment screws 150 and 151 are caused to press against the rear face of the flange 122 to force this brake ring 120 forwardly and at the same time the ends of the yoke member acting on these abutment screws as fulcrums, pull the forward brake ring rearwardly. The forward brake ring element is permitted motion to accommodate itself to the axial position of the flange 116 with which it engages by sliding slightly on the pins 106 and 107.

Swinging motion of the yoke 135 is effected automatically in time with the operation of the machine and for this purpose it has adjacent to its central portion an outwardly extending perforated lug 160 through which may be passed the forward end of a push rod 161, as shown best in Figures 2 and 7. This push rod has threaded thereon pairs of check nuts 166 at either side of the lug 160 and passes through a guide perforation in an arm 162 projecting downwardly and rearwardly from the bracket 101. A pair of check nuts 163 may be threaded on the push rod forwardly of the lug 162 to serve as a stop to limit the motion of the push rod in one direction, and surrounding this push rod, and bearing between the rear face of the lug 162 and a pair of check nuts 164 on the rod, is a coil spring 165, which normally acts to hold the push rod in its rearward position as limited by the check nuts 163, at which time the yoke 160 is rocked to such a position that the brake rings are not pressed against the flange 116 so that the brake is released. This push rod 161 is made fast at its inner end to a slide 170 which is guided for rectilinear movement on a suitable bar, for example, one of the tool carriage control bars 171 used on the Fay lathe, as shown in the Flanders Patent No. 1,219,813, granted March 20, 1917. In order to prevent the member 170 from angular movement on this bar, it is shown as provided with a depending arm 172 having a forked lower end 173 (see Figure 5) which bears over a guide rod 174 which may, if desired, be one of the usual former control rods of the Fay lathe. Extending inwardly from the member 170 is a cam follower 175 which is adapted to be contacted at the proper time by a cam block 180, shown detached in Figure 6, which may be fixed to the outer face of the usual cam drum 181 employed on the Fay lathe for controlling the various tools and also for stopping the machine at the completion of the desired machining operation. This cam 180 is provided with elongated countersunk slots 182 for the reception of bolts by which it may be fixed to the cam drum in the proper angular position thereon in the usual manner in which the controlling cam pieces for other actions controlled by this drum are fixed thereto.

When the machining operations are completed and the machine is about to be stopped, this cam piece 180 is arranged to impinge on the follower 175 and move the member 170 forwardly, thus pushing forwardly on the push rod 161, rocking the yoke 135 and causing the brake rings to engage the flange 116 of the ring gear 60 to stop its rotation while the work spindle continues to rotate for a certain angular distance. This continued rotation of the work spindle, effects a relative turning between the ring gear 60 and the holder 20 in a manner to rotate the work-engaging jaws in a direction to release the work. The machine is then stopped, as will be presently described, with the follower 175 engaged by the high point 183 of the cam piece 180 so that the work-engaging jaws are held in their open position. The finished work may then be readily removed from the machine and a new piece to be machined placed between the spindle centers. The machine is then started, whereupon the cam drum 181 rotates, removing the cam piece 180 from the follower 175 whereupon the spring 165 causes the push rod to move endwise, rocking the yoke 135 in a direction to release the brake from the ring 116. The springs 65 then act to rotate this ring relative to the jaw holder in the direction of rotation of the work spindle so that the jaws are rocked to bring their work-engaging faces into clamping engagement with the work which thereupon becomes connected for rotation with the work spindle so that the machining operations thereon may be effected.

The mechanism for stopping the machine after the desired extent of angular motion of the spindle after the rotation of the gear ring 60 has been stopped may be of any suitable character, but as shown in Figure 1 is of the type commonly employed in the Fay lathe, as shown, for example, in the Flanders patent hereinbefore mentioned. Referring to this figure, a stop cam is shown at 190 projecting from the forward end of the cam drum 181. This is adapted to strike against a follower 191 carried on the end of a crank arm 192 fixed to a rock shaft 193. This rock shaft at its forward end carries an arm 194 to the outer end of which is fixed a pin 195 normally urged upwardly by means of a spring 196. When the cam 190 strikes its follower this pin 195 is pulled downwardly against the tension of this spring and it pulls downwardly therewith a rod or link 197 pivoted at its upper end to a lever arm 198. This lever arm is fulcrumed at 199 and carries on its upper face a latch lug 200, which, when in its raised position, cooperates with a similar lug 201 on a stop lever 202 and holds it in the dotted line position shown in Figure 1, this position of the lever insuring operative driving connections from the main drive pulley 204 to the work spindle in a well known manner. The arm 202 is normally biased to take the full line position shown in Figure 1 when this operative connection is interrupted so that when the arm 198 is depressed to remove the latch lug from the lug 201, this lever is free to assume its biased position, whereupon the machine is stopped as in the Flanders patent heretofore noted.

The cam drum 181 is driven in time with the spindle, gear and shaft connections of any suitable type being indicated at 205 in Figure 1. This mechanism is old and well known in the art, being shown in the Flanders patent hereinbefore mentioned, so that detailed description is believed unnecessary.

In Figures 3 and 4 are shown diagrammatically manners in which a piece of work may be held by the chuck in relation to the machining tools. The jaws shown in Figure 3 have an inclined work-engaging face, as shown at 51 in Figure 10, which engages a tapered extremity 210 of the work placed between the centers 4 and 212. The inclined gripping face 51 of the jaw engages the correspondingly inclined face of the work. Jaws of the type shown in Figure 9 with an axially arranged work-engaging face, may be employed for engaging an axially arranged extremity of the work placed between the centers 4 and 212, such work being shown in Fig. 4. Jaws of various shapes may be employed to suit the shape of the section of the work which is to be engaged by such jaws whether such work is held on centers, or on one center such as 212 on one end and being centered by the chuck jaws on the other end, or whether such work is merely held by such chuck jaws.

As in the constructions hereinbefore described the holder is permitted to float relative to the work spindle, the work is centered between the cone centers, and the chuck jaws adapt themselves automatically to the configuration of the outer face of the work so that a rough casting may be readily held in position for the machining operation irrespective of the contour of its outer face. In certain cases, however, it is desirable to gage the machine operations from the surface contour rather than from a previously determined axis. Where this is desired the center should be omitted and the floating connection between the jaw holder and the spindle eliminated. Such a construction is shown in Figures 24 and 25. In these figures an adapter ring 220 takes the place of the adapter ring 6 and the intermediate coupling member 14 of the previously described construction. This ring, as shown in Figure 24, is recessed on its rear face as shown at 221 for the reception of the nuts and lock washers 28 and 29 of the bolts 26, the bolts in this case, however, passing through closely fitting openings in both the adapter plate 220 and the jaw holder 225. The outer edge of the adapter plate 220 is also formed as a snug fit within the rear end portion of the holder. The adapter plate is threaded on its periphery at at 230 for the reception of the threaded retaining collar 8, as heretofore described, and it is also provided with a key slot 231 on its rear face to take over the key piece 10. Otherwise this construction is the same as that previously described. With this construction the relation of the jaw holder to the spindle is fixed, the jaws being movable simultaneously to and from work-engaging position and acting to center the work by its periphery.

Having thus described certain embodiments of this invention it should be evident to those skilled in the art that various changes and modifications might be made therein without departing from its spirit or scope as defined by the appended claims.

I claim:

1. In a machine of the class described, a rotary work spindle, a stop motion therefor, a chuck fixed to rotate with said spindle, jaws carried by said chuck relatively movable to clamp and release work, a member rotatable relative to said chuck substantially concentrically therewith and acting by its rotation relative to said chuck to actuate said jaws, means for urging said member in the rotary direction of said spindle to move said jaws to clamp work therebetween, and means acting in advance of said stop motion for stopping the rotation of said member with said chuck while said chuck revolves further to cause said member to rotate relative to said chuck in the opposite direction and cause said jaws to release the work.

2. The combination with a machine having a rotary work spindle, and means for rotating said spindle, of a holder fixed to rotate with said spindle, work-clamping jaws on said holder, a member movable on said holder to cause said jaws to grip and release the work, means for arresting the rotation of said movable member while the spindle is rotating, and means automatically acting to stop the spindle a predetermined time interval thereafter.

3. The combination with a machine having a rotary work spindle, and means for rotating the spindle, of a holder floatingly fixed to rotate with said spindle, work clamping jaws on said holder, a member movable on said holder in the direction of rotation of the spindle to cause said jaws to grip the work, means for urging said member in said direction relatively to said holder, means for arresting the rotation of said member while the spindle is rotating, and means automatically acting to stop the spindle and holder at a predetermined time thereafter.

4. The combination with a rotary machine spindle, of a chuck fixed to rotate with said spindle, said chuck comprising work-engaging jaws, a member rotatable relative to said spindle to move said jaws toward and from each other to clamp and release the work, means urging said member to work-clamping position in the direction of rotation of said spindle, friction elements adjacent to the periphery of said member, and means acting to press said elements against said member to stop its rotation with said spindle, whereby further rotation of said spindle acts to move said jaws to release the work.

5. The combination with a rotary machine spindle, of a chuck fixed to rotate with said spindle, said chuck comprising work-engaging jaws, a ring rotatable relative to said chuck and acting when rotated in the direction of rotation of said spindle to cause said jaws to engage work and when rotated in the opposite direction to cause said jaws to release the work, spring means for urging said ring in work-engaging direction, a pair of brake elements positioned on either side of said ring, and a lever fulcrumed on one of said brake elements and engageable with the other brake element and actuable to bring both against said ring to stop its rotation with said chuck and thereby cause a relative rotation therebetween in a direction to release said jaws from the work.

6. The combination with a rotary machine spindle, of a chuck fixed to rotate with said spindle, said chuck comprising work-engaging jaws, a ring rotatable relative to said chuck in the same and opposite directions to the direction of rotation of said spindle for moving said jaws simultaneously into work-engaging and releasing positions, respectively, means normally holding said ring in jaw work-engaging position, a braking element, and means for pressing said braking element against said ring to stop its rotation with said spindle to effect a relative reverse direction of rotation of said ring to move said jaws to release the work.

7. The combination with a rotary machine spindle, of a chuck fixed thereto, said chuck comprising a holder having floating connection to said spindle, work-clamping jaws on said holder, means for moving said jaws simultaneously to grip and release work, and means tending at all times to center said holder relative to said spindle.

8. The combination with a rotary machine spindle, of a chuck fixed thereto, said chuck comprising a holder having a floating connection to said spindle, work-clamping jaws on said holder, means for moving said jaws simultaneously to grip and release work, and resilient means tending to center said holder relative to said spindle.

9. The combination with a rotary machine spindle, of a chuck fixed thereto, said chuck comprising a holder carrying work-clamping jaws, means for moving said jaws simultaneously to grip and release work, means providing a floating connection between said holder and said spindle for all positions of said jaws, and means tending to center the holder relative to said spindle.

10. The combination with a rotary spindle, of a chuck fixed to rotate therewith, said chuck comprising a holder having a floating connection with said spindle, and centering means positioned to resiliently oppose motion of said holder from concentricity with said spindle.

11. The combination with a rotary spindle, of a chuck fixed to rotate therewith, said chuck comprising a rimmed holder having a floating connection with said spindle and normally concentric with said spindle, and a plurality of centering devices inactively engaging the rim of said holder when the latter is concentric with said spindle, each centering device being actuable by motion of the holder in its direction to resiliently oppose said motion.

12. In a machine of the class described, a rotary spindle, an adapter plate secured to said spindle having a transverse channel across the forward face thereof, a chuck comprising a holder having a transverse channel on the rearward face thereof, a disk having a transverse rib on each face thereof for slidable engagement with said channels, said ribs being mutually perpendicular, and means loosely connecting said holder to said spindle for rotation therewith.

13. The combination with a machine having a rotatable work spindle, means for rotating said spindle, means for stopping such rotation, a chuck fixed to said spindle, and jaws carried by said chuck and movable simultaneously to engage and release work, of means for moving said jaws to release the work and for then actuating said stopping means, and means for causing said jaws to engage the work when rotation of said spindle is started.

14. In combination with a machine having a rotating work spindle, a cam drum rotatable in time with said spindle, a stop motion for said spindle, a cam on said drum for actuating said stop motion to stop the rotation of said spindle, a chuck rotatable with said spindle, jaws carried by said chuck and movable to engage and release work, a release cam on said drum, and means actuated by said release cam in advance of the actuation of said stop motion for moving said jaws to release the work.

15. In combination with a machine having a rotating work spindle, a cam drum rotatable in time with said spindle, a stop motion for said spindle, a cam on said drum for actuating said stop motion to stop the rotation of said spindle, a chuck rotatable with said spindle, jaws carried by said chuck and movable to engage and release work, a release cam on said drum, means actuated by said release cam in advance of the actuation of said stop motion for moving said jaws to release the work, and means acting on the start of rotation of said spindle for moving said jaws to clamp the work.

16. In combination with a machine having a rotating work spindle, a cam drum rotatable in time with said spindle, a stop motion for said spindle, a cam on said drum for actuating said stop motion to stop the rotation of said spindle, a chuck rotatable with said spindle, jaws carried by said chuck and movable to engage and release work, a release cam on said drum, means actuated by said release cam in advance of the actuation of said stop motion for moving said jaws to release the work, and means for normally holding said release means inactive.

17. In combination with a machine having a rotating work spindle, a cam drum rotatable in time with said spindle, a stop motion for said spindle, a cam on said drum for actuating said stop motion to stop the rotation of said spindle, a chuck rotatable with said spindle, jaws carried by said chuck and movable to engage and release work, a release cam on said drum, means actuated by said release cam in advance of the actuation of said stop motion for moving said jaws to release the work, means for normally holding said release means inactive, and means acting on the start of rotation of said spindle for moving said jaws to clamp the work.

18. In combination with a machine having a rotary work spindle, and a chuck rotating with said spindle and having jaws movable thereon to engage and release work, of means including a brake device for causing said jaws to release the work when said brake device is set, and means normally holding said brake device released.

19. In combination with a machine having a rotary work spindle, and a chuck rotating with said spindle and having jaws movable thereon to engage and release work, of means including a brake device for causing said jaws to release the work when said brake is set, means for moving said jaws to work-engaging position when said brake device is released, and means normally holding said brake released.

20. In combination, a rotary work spindle, a chuck rotating with said spindle and having jaws movable thereon and normally biased to grip work, means including a brake device for causing such jaws to release the work on setting of said brake, means urging said brake to released position to permit said jaws to engage the work, and means for setting said brake device.

21. In combination with a rotary spindle machine, a chuck having work-engaging jaws fixed to rotate with said spindle, a ring having an outwardly extending flange, said ring being rotatable relatively to said chuck to actuate said jaws to grip and release said work, braking units positioned to bear directly on opposite sides of said flange, and means for pressing said braking units toward each other to exert braking pressure on the sides of said flange.

22. In combination with a rotary spindle machine, a chuck having work-engaging jaws fixed to rotate with said spindle, a ring having a braking surface, said ring being rotatable with respect to said chuck to actuate said jaws to grip and release said work, braking means positioned to bear directly on said braking surface, and means for actuating said braking means.

23. The combination with a machine having a rotary work spindle, means for rotating said spindle, and means actuable to stop the rotation of said spindle, of a chuck fixed to rotate with said spindle, work-clamping jaws carried by said chuck and relatively movable to clamp and release work, means including a member movable in a closed path for alternately moving said jaws to work-clamping position and releasing said jaws when said member reaches predetermined points in its path, and mechanism actuating said stopping means after said member passes the jaw releasing point in its path and before it reaches the jaw closing point.

24. The combination with a machine having a rotary work spindle, means for rotating said spindle, and means actuable to stop the rotation of the spindle, of a chuck fixed to rotate with said spindle, work-clamping jaws carried by said chuck and relatively movable to clamp and release work, means including a member movable in a closed path for maintaining the jaws in work clamping position while said member is in a predetermined portion of its path and for maintaining the jaws in released position while said member is in another predetermined portion of its path, means for causing said member to move along its path while said spindle is rotating, and means acting to stop said rotation and motion when said member enters on the jaw releasing portion of its path.

In testimony whereof I have affixed my signature.

JOHN E. LOVELY.